(12) United States Patent
Huang (10) Patent No.: US 6,907,565 B1
(45) Date of Patent: Jun. 14, 2005

(54) WEB-BASED OUTPUT WRITER AND EDITOR

(75) Inventor: Weishi Huang, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 815 days.

(21) Appl. No.: 09/737,524

(22) Filed: Dec. 13, 2000

(51) Int. Cl.[7] .............................................. G06F 17/00
(52) U.S. Cl. ........................ 715/513; 715/530; 715/526
(58) Field of Search ................................. 715/513, 526, 715/530, 512, 500.1, 501.1, 516; 345/751, 753

(56) References Cited

U.S. PATENT DOCUMENTS

| | | | | |
|---|---|---|---|---|
| 5,596,700 A | * | 1/1997 | Darnell et al. ............... | 715/512 |
| 5,669,005 A | * | 9/1997 | Curbow et al. .............. | 715/523 |
| 5,671,428 A | * | 9/1997 | Muranaga et al. ........... | 345/751 |
| 5,694,544 A | * | 12/1997 | Tanigawa et al. ............ | 345/753 |
| 5,706,452 A | * | 1/1998 | Ivanov ........................ | 345/751 |
| 5,870,767 A | * | 2/1999 | Kraft, IV .................. | 715/501.1 |
| 5,890,177 A | * | 3/1999 | Moody et al. ............... | 715/511 |
| 6,009,441 A | * | 12/1999 | Mathieu et al. ............. | 715/516 |
| 6,230,171 B1 | * | 5/2001 | Pacifici et al. .............. | 715/512 |
| 6,360,236 B1 | * | 3/2002 | Khan et al. ................. | 715/526 |
| 6,438,564 B1 | * | 8/2002 | Morton et al. .............. | 715/500 |
| 6,571,295 B1 | * | 5/2003 | Sidana ........................ | 709/246 |
| 6,687,878 B1 | * | 2/2004 | Eintracht et al. ........... | 715/512 |

OTHER PUBLICATIONS

Browning, "JISC TechWatch Report: Through the Web (TTW) Authoring Tools", 2003, used for background information.*

* cited by examiner

*Primary Examiner*—Joseph Feild
*Assistant Examiner*—James H. Blackwell (57) ABSTRACT

A method and system for creating, viewing and editing an electronic document (e.g., a Web page) using a Web-based tool (a Web browser). A user copies a section of the electronic document into a window, and the copied information is submitted to the browser. The browser returns the information in a window now having a reference scheme (e.g., a ruler) that can be used to specify a position or character string within the document. The user identifies a location within the document and enters remarks associated with that location. The user input is submitted to the browser, which returns an edited version of the document. At each location identified by the user, the edited document includes an index providing a reference to the user's remarks. The user's remarks are provided as footnotes to the edited document.

24 Claims, 9 Drawing Sheets

WEB-BASED OUTPUT WRITER AND EDITOR

TECHNICAL FIELD

The present invention relates to the field of computer system networks. More specifically, the present invention pertains to a platform-independent method and system for creating, viewing and editing electronic documents using a Web browser.

BACKGROUND ART

A "computer system network" can refer to a network located within a firewall of an organization or corporation (e.g., an "Intranet"), as well as to the familiar World Wide Web ("Web") or Internet. In general, computer system networks include numerous server computer systems and client computer systems with attendant equipment such as routers and switches for properly directing traffic (e.g., data, queries, search items, etc.) to their proper destinations.

Computer system networks provide a relatively efficient mechanism for communicating and transferring information between users, regardless of the distance between them. Information residing on one user's computer system can be transferred to another user's computer system, typically by electronic mail (e-mail) over the network. In addition, users can access data and information residing on a central server, such as Web pages, Web sites, databases, and word processing files.

Commonly, a document such as a specification is authored by one user, then provided to other users for review and comment. Typically, the author uses some type of word processing application to generate a draft version for review. A paper copy of the draft can be printed and circulated among the reviewers; however, it is generally more efficient to distribute an electronic version (e.g., a word processing file) of the document to reviewers, usually by e-mail. Alternatively, the reviewer can store the word processing file in a shared memory location on a networked computer system, which reviewers can then access via the computer system network.

In the prior art, problems occur when multiple users attempt to edit an electronic document. The word processing application used by the author is platform-dependent, and therefore reviewers need to use either the same word processing application or a compatible one in order to open and view the document. Typically, word processing applications only work on certain types of operating systems. For example, a Microsoft Word type of application is Windows-based, and will not work on a Unix-based system. Consequently, not all users may be able to open the draft document in order to perform a review, if they are using a word processing application for a different operating system than that of the author.

Even when reviewers are able to open the document, there will still be many cases in which aspects of the electronic document are not accurately transferred from one user to another. For example, the author may have used special formatting and fonts in the document, which are often lost when the document is opened on a different computer system or using a compatible, but different, word processing application. Similarly, reviewers using the same word processing application as the author may be using a different version, and although the versions may be compatible, the document may not transfer accurately from one version to another. In addition, reviewers may each configure their word processing applications with different editing and display options, and this too can affect the way that the draft is received and displayed.

Another problem in the prior art is associated with the distribution of the electronic document to each of the reviewers, in particular when the document is large. Transferring large documents by e-mail may be inefficient. For users trying to receive a large document over a modem connection, the download time may be prohibitive. Moreover, the electronic transfer of data by e-mail may introduce errors into the draft document, or data may be lost in transit.

Instead of e-mail, word processing files can be electronically stored at a central site (e.g., a server) on the computer system network. Documents can be accessed on the server by their file name, or they may be hyperlinked to a Web site or Web page. Nevertheless, the files still need to be downloaded and, for large documents, this can take a great deal of time.

Another problem in the prior art occurs when users wish to edit Web-based information, such as a Web page. For example, a user may wish to add comments to a Web page before forwarding it to another user. In the prior art, the Web page cannot be edited. Instead, the user has to copy the text portion of the Web page and paste it into a word processing application. However, this cannot be done without encountering problems similar to those described above (e.g., loss of formatting). Moreover, formatting problems and the like are typically exacerbated when working with Web pages, because documents in one format (e.g., HyperText Markup Language) are being copied to a different (e.g., word processing) format.

Accordingly, what is needed is a method and/or system that can be used on different platforms to view and edit electronic documents, including Web pages. The present invention provides a novel solution to the above needs.

DISCLOSURE OF THE INVENTION

The present invention provides a method and system that can be used on different platforms to create, view and edit electronic documents, including Web pages. The present invention pertains to a method and system thereof for creating, reviewing and editing electronic documents using a platform-independent tool (a Web browser).

In accordance with the present invention, the electronic documents (e.g., a Web page) use a Web-based format such as HyperText Markup Language (HTML). A document is identified and accessed using a Uniform Resource Locator (URL). Accordingly, each document does not have to be transferred as a file back and forth between reviewers.

In the present embodiment, an electronic document is displayed in a first window of a computer system. A second window, for receiving some part of the document, is generated within the first window. That is, the user (reviewer) selects a portion of the document that is of particular interest, and copies that portion into the second window. The information in the second window is submitted to the browser. The browser returns the second window, still containing the copied information, but adds to the second window a reference scheme which can be used to specify positions within the second window.

In one embodiment, the reference scheme includes a ruler across the top and along one side of the second window, with increments indicating columns and rows, respectively. In this embodiment, the user manually selects a position, character, or character string in the second window by specifying beginning and ending points according to the ruler.

In the present embodiment, fields for receiving user input are provided with the second window. In one embodiment, information specifying a position, character or character string in the second window is received into a first set of fields. This information can be manually input by the user, as described above. Alternatively, this information can be input automatically, based on the position of the cursor, for example.

In the present embodiment, corresponding to the first set of fields is another field for receiving the reviewer's remarks. Any number of fields can be provided for receiving user input, so that the reviewer can select any number of locations within the document (e.g., within the second window) and provide remarks for each.

In the present embodiment, the user input is submitted to the browser. In response, the browser returns for display an edited version of the document. In one embodiment, a unique index (e.g., a superscript or the like) is placed at each of the locations identified by the reviewer. The index provides a reference to the remarks which pertain to that location. In this embodiment, the remarks are provided as footnotes at the bottom or end of the edited version of the document.

Thus, in accordance with the present invention, documents (Web pages) in a format such as HyperText Markup Language (HTML) can be created, reviewed and edited with a platform-independent tool (a Web browser). No additional tools or special software are needed beyond the capability to access the Internet (or Intranet). Documents can be readily accessed and edited by remote users without loss of formatting, and the edited document can be placed back onto the Web so that it can be readily viewed by others. Accordingly, it is not necessary to use platform-dependent applications such as word processing programs to edit documents, and it is not necessary to transfer files back and forth via electronic mail. Overall, the method and system of the present invention provide a convenient and efficient mechanism allowing multiple users to review and edit information of common interest.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating," "creating," "highlighting," "receiving," "providing," "displaying" or the like, refer to actions and processes (e.g., processes 400, 500 and 600 of FIGS. 4, 5 and 6, respectively) of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

Figure 1:
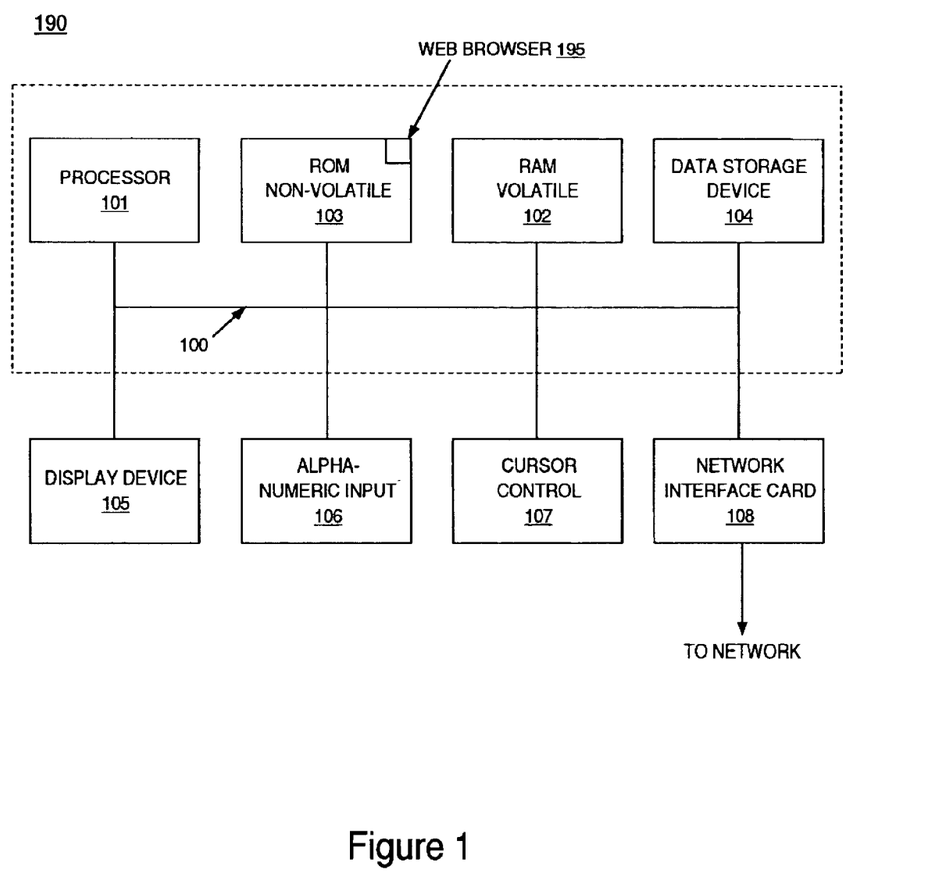
FIG. 1 is a block diagram of an exemplary computer system upon which embodiments of the present invention may be practiced.

Refer now to FIG. 1, which illustrates an exemplary computer system 190 upon which embodiments of the present invention may be practiced. In general, computer system 190 comprises bus 100 for communicating information, processor 101 coupled with bus 100 for processing information and instructions, random access (volatile) memory (RAM) 102 coupled with bus 1000 for storing information and instructions for processor 101, read-only (nonvolatile) memory (ROM) 103 coupled with bus 100 for storing static information and instructions for processor 101, data storage device 104 such as a magnetic or optical disk and disk drive coupled with bus 100 for storing information and instructions, a user output device such as display device 105 coupled to bus 100 for displaying information to the computer user, a user input device such as alphanumeric input device 106 including alphanumeric and function keys coupled to bus 100 for communicating information and command selections to processor 101, and a user input device such as cursor control device 107 coupled to bus 100 for communicating user input information and command selections to processor 101. Furthermore, a network interface card (NIC) 108 or like device is used to couple computer system 190 onto, for example, a client-server computer system network (e.g., network 170 of FIG. 2 below).

With reference still to FIG. 1, display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer or cursor) on a display screen of display device 105. Many implementations of cursor control 107 are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

In the present embodiment, a Web browser 195 is implemented as software instructions stored in memory (e.g., ROM 103) and executed by processor 101. In another embodiment, Web browser 195 is implemented on a magnetic or optical disk (e.g., data storage device 104) that may be read into memory (e.g., RAM 102) and/or executed by processor 101.

In general, Web browsers are known in the art; however, Web browser 195 of the present invention incorporates a set of encoded program instructions that provide it with the functionality to create, view and edit Web-based information that is in a format such as HyperText Markup Language (HTML), Standard Generalized Markup Language (SGML), Extensible Markup Language (XML), or any other markup language. In the present embodiment of the present invention, Web browser 195 also includes a set of encoded program instructions for providing a graphical user interface to assist the user with executing the edit function. In one embodiment, the edit and graphical user interface instructions are provided by a CGI (Common Gateway Interface) software routine written in PERL (Practical Extraction and Report Language). Additional information is provided below in conjunction with FIGS. 3A, 3B, 3C, 3D, 4, 5 and 6.

Figure 2:
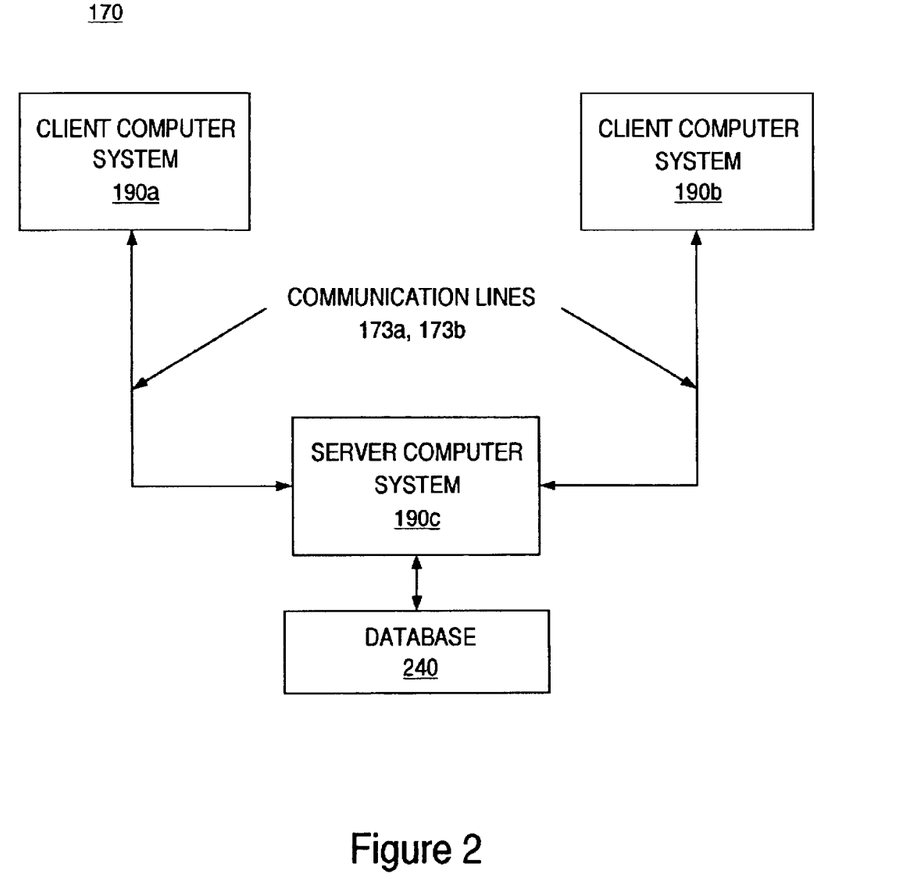
FIG. 2 is a block diagram illustrating an exemplary computer system network upon which embodiments of the present invention may be practiced.

FIG. 2 is a block diagram illustrating an exemplary client-server computer system network 170 ("network 170") upon which embodiments of the present invention may be practiced. Network 170 may be a communication network located within a firewall of an organization or corporation (an "Intranet"), or network 170 may represent a portion of the World wide Web or Internet.

Client (or user) computer systems 190a and 190b and server computer system 190c are communicatively coupled via communication lines 173a and 173b; the mechanisms for coupling computer systems over the Internet or over Intranets are well-known in the art. This coupling can be accomplished over any network protocol that supports a network connection, such as Internet Protocol, TCP (Transmission Control Protocol), NetBIOS, IPX (Internet Packet Exchange), and LU6.2, and link layers protocols such as Ethernet, token ring, and ATM (Asynchronous Transfer Mode). Alternatively, the coupling can be accomplished using a wireless connection in conjunction with appropriate network protocols. Otherwise, client computer systems 190a and 190b can be coupled to server computer system 190c via an input/output port (e.g., a serial port) of server computer system 190c. It is appreciated that, for simplicity, only two client computer systems and a single server computer system are shown; however, it is understood that network 170 may comprise any number of client computer systems and server computer systems.

In accordance with the present embodiment of the present invention, client computer systems 190a and 190b implement Web browser 195 (FIG. 1). However, because Web browser 195 is platform-independent, computer systems 190a and 190b can use different operating systems.

Continuing with reference to FIG. 2, in the present embodiment, a database 240 resides on server computer system 190c. Database 240 contains information that typically can be accessed from a Web site using Web browser 195. For example, database 240 can contain Web pages, electronic documents, and the like, each identifiable by a unique Uniform Resource Locator (URL) in a known manner. As described above, in accordance with the present invention, Web browser 195 incorporates an edit function that provides users with the capability to create, view and edit information (Web pages and the like) contained in database 240, and to write new and edited documents to database 240.

FIGS. 3A, 3B, 3C and 3D illustrate the graphical user interfaces for creating, viewing and editing electronic documents and Web pages in accordance with one embodiment of the present invention. The graphical user interfaces are generated by Web browser 195 and displayed on display device 105 of computer system 190 (FIG. 1).

Figure 3A:
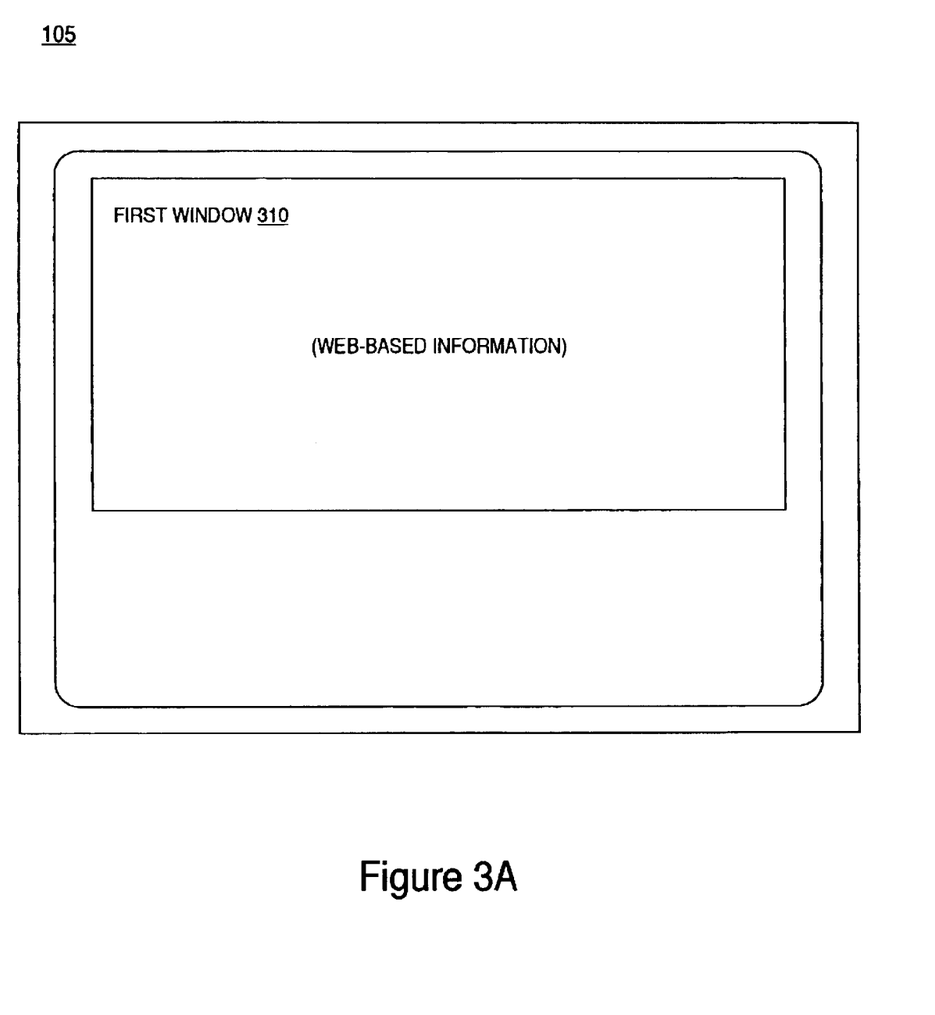
FIGS. 3A, 3B, 3C and 3D illustrate the graphical user interfaces for editing Web-based information in accordance with one embodiment of the present invention.

With reference first to FIG. 3A, an electronic document such as a word processing document, or Web-based information such as a Web page, an electronic document displayed as a Web page, or the like, is displayed in a first window 310.

Figure 3B:
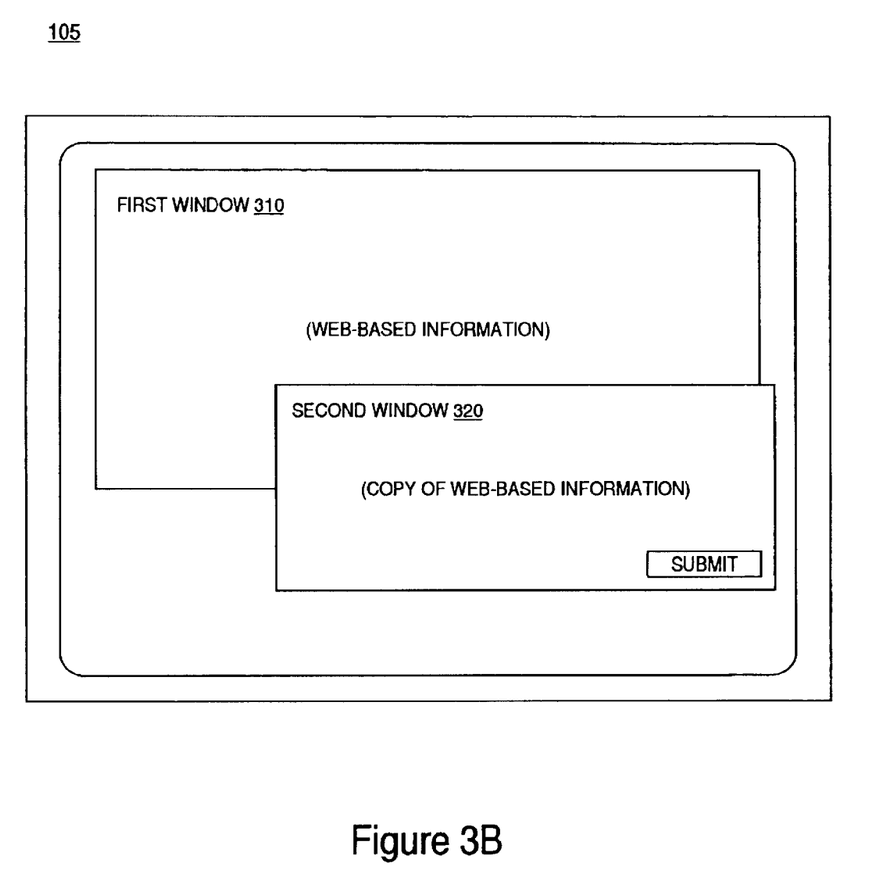

With reference now to FIG. 3B, when the edit function of Web browser 195 is executed, a second window 320 is generated by Web browser 195. In accordance with the present embodiment of the present invention, second window 320 is for receiving a copy of all or part of the information from first window 310. That is, the user copies and pastes the information, or a portion thereof, from first window 310 to second window 320 in a conventional manner. Alternatively, the user can type information into second window 320. The information in second window 320 is then submitted to Web browser 195. In one embodiment, the graphical user interface of the present invention includes a "submit" button that can be actuated using the cursor.

Figure 3C:
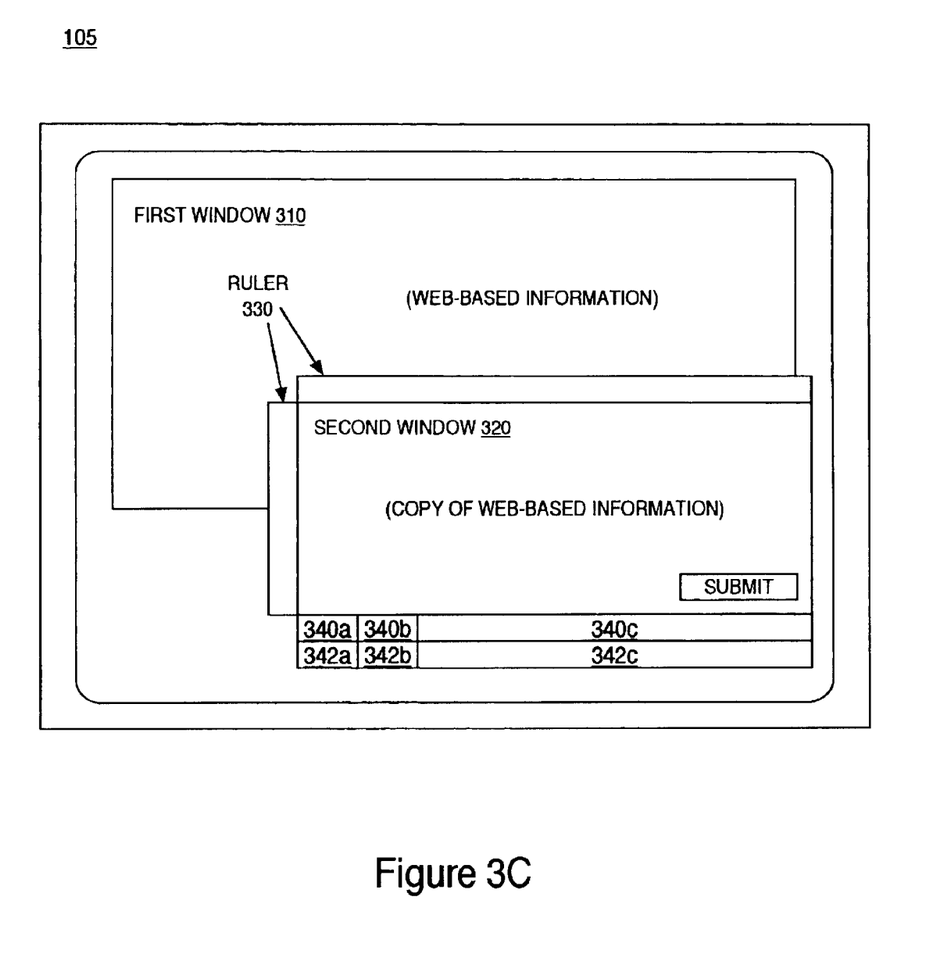

Referring next to FIG. 3C, after second window 320 is submitted, Web browser 195 adds a reference scheme to second window 320. In one embodiment, the reference scheme is a ruler 330 that is positioned across the top and along one side of second window 320. Ruler 330 can be incremented in various ways in order to indicate a position within second window 320 (and hence within the Web-based information inside second window 320). For example, ruler 330 can indicate columns across the top and rows along the side of second window 320. Thus, a position or character within second window 320 can be specified by specifying the column and row number corresponding to that position. Similarly, a character string in second window 320 can be specified by specifying the column and row corresponding to the beginning of the character string, and the column and row corresponding to the end of the character string.

Web browser 195 also causes the fields 340a, 340b, 340c, 342a, 342b and 342c to be generated. In the present embodiment, fields 340a and 340b are for receiving user input that specifies a position or character, or the beginning and end of a character string, within second window 320. Similarly, fields 342a and 342b are for receiving user input that specifies another position or character, or the beginning and end of another character string, within second window 320. It is appreciated that any number of such fields can be generated, so that the user can specify a multiplicity of locations within second window 320.

The position information can be manually entered into fields 340a, 340b, 342a and 342b by the user. Alternatively, the position information can be entered automatically based on the position of the cursor or corresponding to the movement of the cursor. For example, the user can highlight ("paint") a character string using the cursor, and the beginning and end points of the character string can be automatically entered into a set of fields such as fields 340a and 340b.

In the present embodiment, field 340c corresponds to fields 340a and 340b. Field 340c is for receiving remarks from the user that pertain to the information in second window 320 at the position identified by the information in fields 340a and 340b. Similarly, field 342c corresponds to fields 342a and 342b, and is for receiving additional remarks from the user that pertain to the position identified by fields 342a and 342b. It is appreciated that any number of such fields can be generated, so that the user can provide remarks for a multiplicity of locations within second window 320.

The information in fields 340a, 340b, 340c, 342a, 342b and 342c Is then submitted to Web browser 195. In one embodiment, the graphical user interface of the present invention includes a "submit" button that can be actuated using the cursor.

Figure 3D:
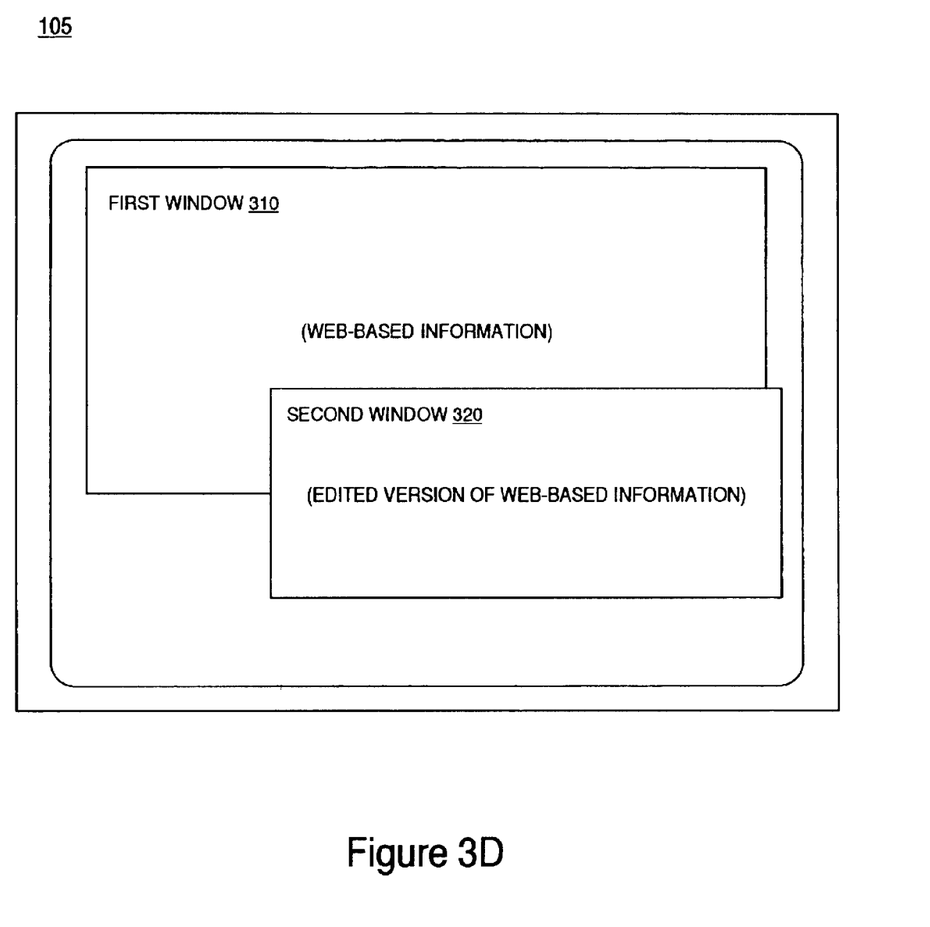

Referring next to FIG. 3D, Web browser 195 displays, in second window 320 (or in a new or different window), an edited version of the information that was submitted. In one embodiment, each position, character, or character string that was identified by the user (e.g., the positions specified in fields 340a, 340b, 342a, and 342b) is highlighted or otherwise distinguished from the other information in second window 320. In the present embodiment, each position, character, or character string that was identified by the user is indexed. The index at each location provides a reference to the remark associated with that location. In one embodiment, a superscript is used, although it is appreciated that other types of indexes can be used. In the present embodiment, the users remarks are provided at the end of the edited version of the Web page or document (e.g., as footnotes). For example, the location identified by fields 340a and 340b can be indexed with a superscript "1" and the remark associated with that location is provided as footnote "1" at the end of the edited version of the document.

In accordance with the present invention, a unique URL is assigned to the edited version of the information. Web browser 195 can then be used to save the edited version in database 240 (FIG. 2). Subsequently, the edited document can be accessed and retrieved by another user for review and further comment.

Figure 4:
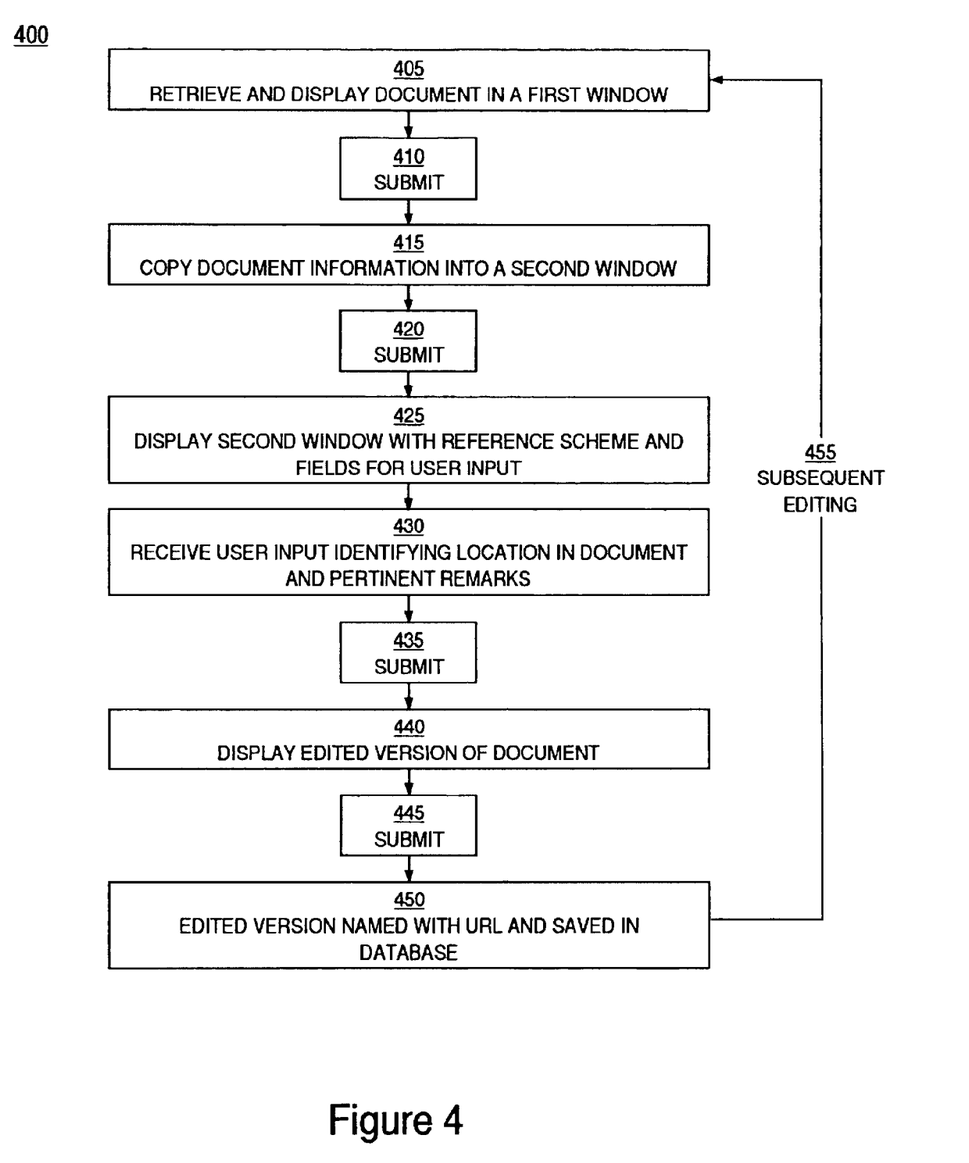
FIG. 4 is a flowchart of the steps in a process for editing Web-based information in accordance with one embodiment of the present invention.

FIG. 4 is a flowchart of the steps in a process 400 for editing Web-based information (such as electronic documents and Web pages) in accordance with one embodiment of the present invention. In accordance with the present invention, process 400 is implemented using Web browser 195 (FIG. 1). Process 400 can be implemented via computer-readable program instructions stored in a memory unit (e.g., random access memory 102, read-only memory 103, and/or data storage device 104) and executed by processor 101 of computer system 190 (FIG. 1) in a client-server computer system network (e.g., network 170 of FIG. 2).

In step 405 of FIG. 4, a document is retrieved by Web browser 195 and displayed on a display device 105 of a computer system 190 (FIG. 1) coupled to the computer system network 170 (FIG. 2). In one embodiment, the document is retrieved according to process 500 described in conjunction with FIG. 5, below.

In accordance with the present embodiment of the present invention, the document is displayed in a first window 310 generated by Web browser 195 on display device 105 (FIG. 3A). Web browser 195 is platform-independent, and therefore can be operated on different computer systems executing different operating systems. The document is also platform-independent, and therefore can be opened using Web browser 195 independent of the operating system in use. Furthermore, when the document is opened, the formatting and other particular aspects of the document will be retained. Thus, the document can be accurately communicated to each reviewer without losing formatting and the like.

In step 410 of FIG. 4, the user selects the edit function of Web browser 195 and submits the document to Web browser 195 in accordance with the present invention.

In step 415 of FIG. 4, in the present embodiment, the information in first window 310, or a portion of that information, is copied into second window 320 of FIG. 3B. In accordance with the present invention, second window 320 is generated by Web browser 195 on display device 105. The information in first window 310 therefore can be copied and pasted in the same language with which it was prepared (e.g., HTML), and thus formatting and the like are properly retained.

In step 420 of FIG. 4, the information in second window 320 is submitted to Web browser 195. In step 425, in the present embodiment, Web browser 195 returns and displays second window 320, still containing the information that was copied thereto in step 415. In accordance with the present invention, Web browser 195 adds a graphical user interface to second window 320.

In one embodiment, as shown by FIG. 3C, the graphical user interface includes a ruler 330 for specifying position information that identifies a location, character or character string within second window 320 (and therefore within the information contained therein). The graphical user interface also includes fields 340a and 340b, for example, for receiving the position information, and fields such as field 340c for receiving remarks associated with each location, character or character string selected by the user.

In step 430 of FIG. 4, in the present embodiment, the user enters position information and associated remarks into the fields generated by Web browser 195 (e.g., fields 340a, 340b and 340c of FIG. 3C). In step 435, the user input is submitted to Web browser 195.

In step 440 of FIG. 4, Web browser 195 displays on display device 105 an edited version of the document. In the present embodiment, the edited document is displayed within second window 320 (FIG. 3D), although a new or different window can be used instead. The edited version of the document includes, for each position, character or character string identified by the user in step 430, an index (e.g., a superscript) that provides a reference to the remarks associated with that position. In the present embodiment, the remarks (from step 430) are provided as footnotes at the end of the edited document, each footnote enumerated according to its respective index. In one embodiment, each position, character or character string identified by the user in step 430 is highlighted in some manner to distinguish it from surrounding information. In this manner, comments made by a reviewer can be readily detected by another user.

In step 445 of FIG. 4, the edited document is submitted to Web browser 195. In step 450, the edited document is given a URL and saved in database 240, so that it can be accessed and viewed by other users. In step 455, subsequent editing of the revised version of the document, or of the original version, can be performed as described above.

Figure 5:
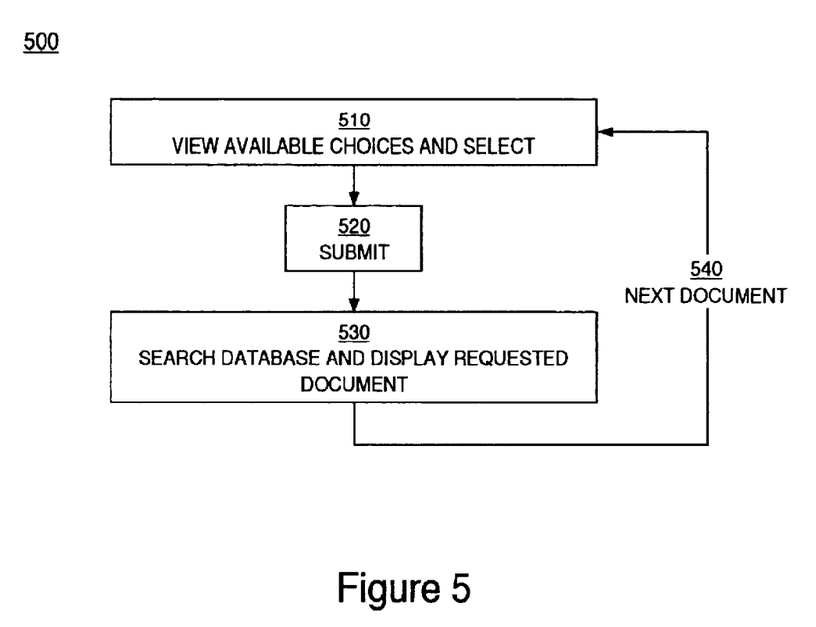
FIG. 5 is a flowchart of the steps in a process for viewing Web-based information in accordance with one embodiment of the present invention.

FIG. 5 is a flowchart of the steps 1n a process 500 for viewing Web-based information (such as electronic documents and Web pages) in accordance with one embodiment of the present invention. In accordance with the present invention, process 500 is implemented using Web browser 195 (FIG. 1). Process 500 can be implemented via computer-readable program instructions stored in a memory unit (e.g., random access memory 102, read-only memory 103, and/or data storage device 104) and executed by processor 101 of computer system 190 (FIG. 1) in a client-server computer system network (e.g., network 170 of FIG. 2).

In step 510 of FIG. 5, electronic documents (such as but not limited to a Web page) are saved and stored in a database 240 (FIG. 2). Accordingly, a list of these documents can be accessed via a computer system network 170, and viewed on computer system 190a and/or 190b (FIG. 2). Each document is uniquely identifiable by a URL, for example. The user can select a document from the list of available documents.

In step 520 of FIG. 5, the user's selection is submitted to Web browser 195. In step 530, the document is displayed in a first window 310 on display device 105 (FIG. 3A). In step 540, other documents can be similarly selected, retrieved and displayed.

Therefore, in accordance with the present invention, the document (or the file containing the document) does not need to be transferred from one user to another (e.g., from an author to a reviewer) by electronic mail or other such mechanisms. Distribution of the document to other users and reviewers is thereby facilitated and accelerated.

Figure 6:
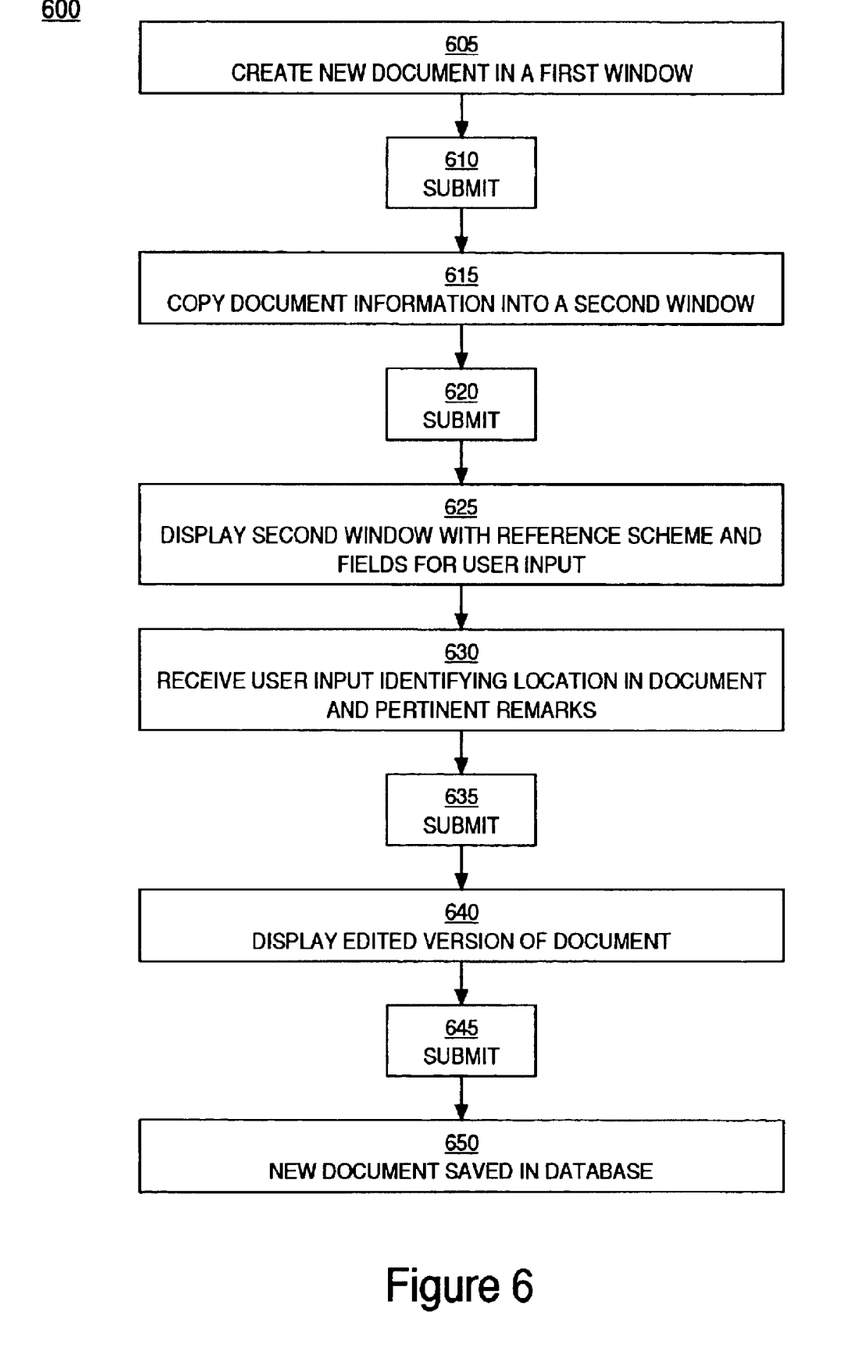
FIG. 6 is a flowchart of the steps in a process for creating Web-based information in accordance with one embodiment of the present invention.

FIG. 6 is a flowchart of the steps in a process 600 for creating Web-based information (such as electronic documents and Web pages) in accordance with one embodiment of the present invention. In accordance with the present invention, process 600 is implemented using Web browser 195 (FIG. 1). Process 600 can be implemented via computer-readable program instructions stored in a memory unit (e.g., random access memory 102, read-only memory 103, and/or data storage device 104) and executed by processor 101 of computer system 190 (FIG. 1) in a client-server computer system network (e.g., network 170 of FIG. 2).

In step 605 of FIG. 6, a user can create a new document in first window 310. (FIG. 3A) using a conventional word processing application or the like. The user then selects the function of Web browser 195 associated with creating a new document and submits this to Web browser 195 in accordance with the present invention (step 610).

In step 615, in the present embodiment, the information in first window 310, or a portion of that information, is copied into second window 320 of FIG. 3B. Alternatively, the user can type (or otherwise enter) information into second window 320. In accordance with the present invention, second window 320 is generated by Web browser 195 on display device 105.

In step 620 of FIG. 6, the information in second window 320 is submitted to Web browser 195. In step 625, in the present embodiment, Web browser 195 returns and displays second window 320, still containing the information that was entered into second window 320 in step 615. In accordance with the present invention, Web browser 195 adds a graphical user interface to second window 320.

In one embodiment, as shown by FIG. 3C, the graphical user interface includes a ruler 330 for specifying position information that identifies a location, character or character string within second window 320 (and therefore within the information contained therein). The graphical user interface also includes fields 340a and 340b, for example, for receiving the position information, and fields such as field 340c for receiving remarks associated with each location, character or character string selected by the user.

In step 630 of FIG. 6, in the present embodiment, the user enters position information and associated remarks into the fields generated by Web browser 195 (e.g., fields 340a, 340b and 340c of FIG. 3C). In step 635, the user input is submitted to Web browser 195.

In step 640 of FIG. 6, Web browser 195 displays on display device 105 an edited version of the newly created document in the present embodiment, the edited version of the newly created document is displayed within second window 320 (FIG. 3D), although a new or different window can be used instead. The edited version of the newly created document includes, for each position, character or character string identified by the user in step 630, an index (e.g., a superscript) that provides a reference to the remarks associated with that position. In the present embodiment, the remarks (from step 630) are provided as footnotes at the end of the document, each footnote enumerated according to its respective index. In one embodiment, each position, character or character string identified by the user in step 630 is highlighted in some manner to distinguish it from surrounding information.

In step 645 of FIG. 6, the newly created document is submitted to Web browser 195. In step 650, the new document is saved in database 240 according to its URL, so that it can be subsequently accessed, viewed and edited by other users in accordance with processes 400 and 500 of FIGS. 4 and 5, respectively.

Because Web browser 195 of the present invention can be used to create, view and edit documents, documents previously prepared using word processing applications can instead by prepared as Web pages in the HTML format, for example. Consequently, documents can be more frequently prepared for and loaded onto the Internet (or Intranet), providing a number of advantages. First, the document can be stored in a location from which it can be readily retrieved by other users via a computer system network using a unique URL. Second, the browser and the document are each platform-independent, therefore, the browser can be executed and the document viewed by all users, independent of the operating system or other platform-dependent attributes. Furthermore, the document is more conveniently and quickly accessed and viewed, improving the efficiency and speed at which information can be shared and reviewed.

One example application of the present invention is to the generation and documentation of computer system network performance data. With the present invention, users (e.g., engineers) can share and review network performance data in a fast and efficient manner. Users can share information regardless of their location, by connecting with the Internet or Intranet. The software development cycle (parsing engine) can be significantly reduced in length, because engineers can write a parser specification more quickly, yet with greater accuracy and readability. For example, using the present invention, the engineer can identify instances in which network data exceed allowable limits, highlight those instances, and index them to a related remark. Another user (e.g., a software developer) subsequently reviewing the edited version of the network data will be able to find those instances using the indexing and/or highlighting which were added to the document by the engineer. In addition, the subsequent user can refer to the engineer's remarks to gain insight not otherwise available. For example, the engineer can define terms used in the document, provide suggestions, or provide details concerning the reasons certain instances are highlighted. Furthermore, the present invention can be used to search for specific terms (characters or character strings) within a document.

The preferred embodiment of the present invention, web-based output writer and editor, is thus described. While the present invention has been described in particular embodiments, it should be appreciated that the present invention should not be construed as limited by such embodiments, but rather construed according to the following claims.

What is claimed is:

1. A method for editing a Web page using a Web browser, said method comprising:
   a) displaying said Web page within a first window on a display device of a computer system;
   b) generating a second window within said first window, said second window for displaying a copy of at least a portion of said Web page that is copied from said first window and pasted into said second window;
   c) receiving user input comprising remarks associated with a position within said Web page, said position identified using a two-dimensional reference scheme that is graphically represented along two sides of said second window; and
   d) creating an edited version of said Web page, said edited version comprising said remarks indexed to said position.

2. The method for editing a Web page using a Web browser as recited in claim 1 wherein said Web page is in an HTML (HyperText Markup Language) format.

3. The method for editing a Web page using a Web browser as recited in claim 1 wherein said step c) comprises:
   receiving position information identifying a beginning point and an ending point of a character string corresponding to said position within said Web page.

4. The method for editing a Web page using a Web browser as recited in claim 3 wherein said step b) comprises:
   providing with said second window a user interface comprising fields for receiving said remarks and said position information.

5. The method for editing a Web page using a Web browser as recited in claim 1 wherein said step d) comprises:
   highlighting in said edited version a character string corresponding to said position within said Web page.

6. The method for editing a Web page using a Web browser as recited in claim 1 wherein said Web page and said edited version of said Web page are identified by Uniform Resource Locators (URLs).

7. A computer system in a computer system network, said computer system comprising:
   a bus;
   a display device coupled to said bus;
   a processor coupled to said bus; and
   a memory unit coupled to said bus, said memory unit containing instructions that when executed implement method for editing a Web page using a Web browser, said method comprising:
   a) displaying said Web page within a first window on said display device, said first window generated by said Web browser;
   b) generating a second window within said first window said second window generated by said Web browser, said second window for receiving information comprising a copy of at least a portion of said Web page;
   c) receiving user input comprising remarks associated with a position within said Web page, said position identified using a two-dimensional reference scheme that is graphically represented along two sides of said second window; and
   d) creating an edited version of said Web page, said edited version comprising said remarks indexed to said position.

8. The computer system of claims 7 wherein said Web page is in an HTML (HyperText Markup Language) format.

9. The computer system of claim 7 wherein said step c) of said method for editing a Web page using a Web browser comprises:
   receiving position information identifying a beginning point and an ending point of a character string corresponding to said position within said Web page.

10. The computer system of claim 9 wherein said step b) of said method for editing a Web page using a Web browser comprises:
    providing with said second window a user interface comprising fields for receiving said remarks and said position information.

11. The computer system of claim 7 wherein said step d) of said method for editing a Web page using a Web browser comprises:
    highlighting in said edited version a character string corresponding to said position within said Web page.

12. The computer system of claim 7 wherein said Web page and said edited version of said Web page are identified by Uniform Resource Locators (URLs).

13. A computer-usable medium having computer-readable program code embodied therein for causing a computer system to perform a method comprising:
    a) displaying a Web page within a first window on a display device of a computer system;
    b) generating a second window within said first window, said second window for displaying information that is copied from said first window;
    c) receiving user input comprising remarks associated with a position within said Web page, said position identified using a two dimensional reference scheme that is graphically represented along two sides of said second window; and
    d) creating an edited version of said Web page, said edited version comprising said remarks indexed to said position.

14. The computer-usable medium of claim 13 wherein said Web page is in an HTML (HyperText Markup Language) format.

15. The computer-usable medium of claim 13 wherein said computer-readable program code embodied therein causes a computer system to perform said method comprising:
receiving position information identifying a beginning point and an ending point of a character string corresponding to said position within said Web page.

16. The computer-usable medium of claim 15 wherein said computer-readable program code embodied therein causes a computer system to perform said method comprising:
providing with said second window a user interface comprising fields for receiving said remarks and said position information.

17. The computer-usable medium of claim 13 wherein said computer-readable program code embodied therein causes a computer system to perform said method comprising:
highlighting in said edited version a character string corresponding to said position within said Web page.

18. The computer-usable medium of claim 13 wherein said Web page and said edited version of said Web page are identified by Uniform Resource Locators (URLs).

19. A system for editing a Web page using a Web browser, said system comprising:
means for displaying said Web page;
means for generating a second window within said first window, said second window for displaying information comprising at least a portion of said Web page that is copied from said first window and pasted into said second window;
means for receiving user input comprising remarks associated with a position within said Web page, said position identified using a two-dimensional reference scheme that is graphically represented along two sides of said second window; and
means for creating an edited version of said Web page, said edited version comprising said remarks indexed to said position.

20. The system of claim 19 wherein said Web page is in an HTML (HyperText Markup Language) format.

21. The system of claim 19 comprising:
means for receiving position information identifying a beginning point and an ending point of a character string corresponding to said position within said Web page.

22. The system of claim 21 further comprising:
means for providing with said second window a user interface comprising fields for receiving said remarks and said position information.

23. The system of claim 19 comprising:
means for highlighting in said edited version a character string corresponding to said position within said Web page.

24. The system of claim 19 wherein said Web page and said edited version of said Web page are identified by Uniform Resource Locators (URLs).

* * * * *